United States Patent [19]

Krofchak

[11] 4,229,295
[45] Oct. 21, 1980

[54] SOLIDIFICATION OF AQUEOUS SLUDGE

[76] Inventor: David Krofchak, 160 Torbay Rd., Markham, Ontario, Canada L3R 1G6

[21] Appl. No.: 23,104

[22] Filed: Mar. 23, 1979

Related U.S. Application Data

[63] Continuation-in-part of Ser. No. 804,426, Jun. 7, 1977, abandoned, which is a continuation-in-part of Ser. No. 539,125, Jan. 7, 1975, abandoned.

[30] Foreign Application Priority Data

Jan. 10, 1974 [GB] United Kingdom ............... 1205/74

[51] Int. Cl.$^2$ ................................................ C02C 3/00
[52] U.S. Cl. .................................. 210/723; 405/263; 210/751; 210/753
[58] Field of Search ............... 106/83, 96, 116, 273 R, 106/287 S; 208/13; 210/10, 42 R, 45, 49, 51, 54, 59, 60, 170; 405/264–266

[56] References Cited

U.S. PATENT DOCUMENTS

| | | | |
|---|---|---|---|
| 2,210,545 | 8/1940 | Hamilton | 405/266 |
| 3,243,962 | 4/1966 | Ratliff | 405/266 |
| 3,502,575 | 3/1970 | Hepp et al. | 210/42 R |
| 3,526,585 | 9/1970 | Camp | 210/54 |
| 3,816,305 | 6/1974 | Schutte | 210/59 |
| 3,841,102 | 10/1974 | Cinner et al. | 210/170 |
| 3,876,429 | 4/1975 | Schneider | 106/287 SS |
| 3,917,529 | 11/1975 | Madole et al. | 210/54 |
| 3,977,971 | 8/1976 | Quinn et al. | 210/49 |
| 4,018,679 | 4/1977 | Bolsing | 210/59 |
| 4,019,327 | 4/1977 | Kempster | 405/264 |

FOREIGN PATENT DOCUMENTS 1310491 3/1973 United Kingdom ............... 210/53

*Primary Examiner*—Charles N. Hart
*Assistant Examiner*—Peter A. Hruskoci
*Attorney, Agent, or Firm*—Robert F. Delbridge; Arne I. Fors

[57] ABSTRACT

A process for treating aqueous sludge comprising a slurry of clay minerals and silica in water includes rapidly dispersing throughout the sludge at least one additive compound selected from the group consisting of mineral acids, acid salts of alkaline earth metals, alkaline earth metal oxides and alkaline earth metal hydroxides. The additive is provided in an amount sufficient to cause formation in the sludge of large silicate molecules with resultant solidification of the sludge by gelling and setting into an inert solid material.

9 Claims, No Drawings

SOLIDIFICATION OF AQUEOUS SLUDGE

This application is a continuation-in-part of application Ser. No. 804,426 filed June 7, 1977 (now abandoned) which is a continuation-in-part of application Ser. No. 539,125, filed Jan. 7, 1975 (now abandoned).

This invention relates to a process for treating aqueous sludge comprising a slurry of clay minerals and silica in water. Such sludge is produced, for example, as tailings during the recovery of bitumen from oil sands or shales by hot water separation methods.

It is known to process tar sands for recovery of bitumen by mixing the sands with hot water and steam in conditioning drums. The bitumen is then separated from the sand as it floats to the surface in separation cells. The essentially oil or tar free sand and water are then pumped to a settling pond. Ideally, the sand and other solids settle out and the clean water is re-used and/or returned to the natural water courses.

Unfortunately, a large portion of the sand and/or other solids does not settle out but remains in suspension in the aqueous phase. The whole mass, after removal of surface water is, in effect, a very fluid slurry or sludge known as "tailings sludge".

A typical analysis of the tailings sludge from a commercial scale plant is 25% solids (namely 3% bitumen and 22% other solids) and 75% water. The solids are composed of various constituents including silica, zircon, mica, kaolinite, montmorillonite, illite and chlorite. The amount of each of the above noted solids constituents will vary from time to time and place to place but, usually, kaolinite will constitute about 50% of the total solids.

As a result of the inability to obtain effective liquid-solids separation through natural settling action, the problem of tailings disposal becomes progressively more acute as more and more sands are processed, because the aqueous sludge accumulates in direct proportion to the amount of sands processed. From an environmental standpoint, a bad situation develops since on one hand gigantic holes are formed in the ground by the mining of the sands and, on the other hand, gigantic lakes of aqueous sludge are formed by the disposal of the tailings.

Many solutions to this problem have been proposed, among these being flocculation, filtration, use of hydrocyclones and centrifuges, distillation and freeze-thaw methods. All of these approaches have been unsatisfactory for technical or economic reasons. Ideally, if the aqueous sludge could be converted to solid material to fill the excavations caused by the mining, an ecological balance and recovery would result.

An important object of this invention is therefore to provide an effective and economic process for converting such aqueous sludges to a solid form so that they can be utilized as a construction material for dykes, road bases, earth dams or as structurally sound fill material for excavations.

The present invention is based on the discovery that, if a sufficient amount of an additive compound selected from the group specified below is rapidly dispersed throughout the sludge, large silicate molecules are formed which cause the sludge to solidify by gelling and setting into an inert solid material.

The addition compound is at least one member selected from the group consisting of mineral acids, acid salts of alkaline earth metals, alkaline earth metal oxides and alkaline earth metal hydroxides.

Additive compounds which are suitable for the process of the invention include $H_2SO_4$, $HCl$, $HNO_3$, $CaO$, $MgO$, $CaCl_2$, $Ca(OH)_2$ and $Mg(OH)_2$. $H_2SO_4$ and $CaO$ are preferred additives because they are highly effective even in very small amounts and also because these compounds will usually be readily available at low cost.

The quantity of additive compound used depends on the type of compound, the desired rate of solidification and, most importantly, economic factors. From an economic point of view, it is desirable to use the smallest amount of additive compound that will be effective to cause solidification of the sludge. From about 0.01% to about 0.5% by weight additive compound should be used, with the preferred range being from about 0.05% to about 0.25%. An ideal amount is about 0.1% by weight additive compound, although quantities several times larger than this may be employed if circumstances warrant it. An excessive amount of additive compound may cause an undesirably rapid solidification, for example when the additive is $CaO$. Also, when the additive is an acid, the reaction may not result in complete solidification if an excessive amount of additive compound is used.

An important requirement of the process is that the additive compound be rapidly dispersed throughout the sludge. Only if this is done can solidification be achieved with addition of the small quantities of additive compound cited above. If the compound is added too slowly, the initial solidification reaction will take place only within a localized area within the body of sludge under treatment, and subsequent dispersal of the reaction products throughout the body of the sludge is ineffective in causing solidification of the total mass of the sludge. The additive compound must be dispersed throughout the entire mass of sludge under treatment before the initial reaction between the additive compound and the sludge is complete, so that the entire mass of the sludge will be solidified as the reaction proceeds to completion.

The required rapid dispersal of the additive compound throughout the sludge may be obtained by injecting a solution of additive compound into the inlet of a pump such as a centrifugal pump which is being utilized to transfer the sludge from one location to another, for example, from an original storage location through a pipeline to the location where it is desired to utilize the treated sludge as structural or fill material. The pump is preferably a centrifugal pump, with the impeller blades effecting a shearing action to rapidly disperse the additive compound throughout the sludge as it passes through the pump. The pump should preferably be operated at a speed of at least 100 rpm to effect the rapid dispersement, and a pump speed as high as 3,500 rpm may be used. Thus, the additive compound is dispersed throughout the sludge in a very short time of the order of one second or less.

Rapid dispersal of the additive compound throughout the sludge in this manner not only provides the technical success of the invention, but also provides commercial success since very little additive compound need be used. Where thousands of gallons of sludge are to be treated, the fact that very small amounts of additive compounds can be used results in the invention being very attractive from a commercial point of view.

Because of the very complex chemical and physical nature of the sludges with which the present invention is concerned, it is not possible to explain the precise mechanism of the reactions which occur as a reslt of the rapid dispersal of the additive compound throughout the sludge in accordance with the invention. However, one possible, somewhat simplified explanation may be as follows:

If sulphuric acid is used as the additive compound and if it is assumed that sulphuric acid reacts with kaolinite as follows:

$$Al_2O_3 \cdot 2SiO_2 \cdot 2H_2O + 3H_2SO_4 \rightarrow Al_2(SO_4)_3 + 2SiO_2 + 5H_2O \qquad (1)$$

it follows that $SiO_2$ will be available to react with other components in the sludge to form complex silicate compounds. Assuming also that the sulphuric acid reacts with only a small percentage of the kaolinite with the pH not being reduced below about 7, it can be assumed that the $Al_2(SO)_3$ formed will be hydrolyzed, for example:

$$Al_2(SO_4)_3 + 3H_2O \rightarrow 2Al(OH)_3 + 3H_2SO_4 \qquad (2)$$

Equation (2) assumes the pH remains about 7, and for the small quantities of acid used this situation actually exists.

Reactions (1) and (2) would then trigger a chain of other reactions such as:

$$(Mg.CO_3 \ldots CaCO_3) + H_2SO_4 \rightleftharpoons CaO + Co_2 + CaSO_4 \qquad (3)$$

and also $$CaO + Al_2O_3 \cdot 2SiO_2 \cdot 2H_2O \rightarrow CaO \cdot Al_2O_3 \cdot 2SiO_2 \qquad (4)$$

Also, free $SiO_2$ will tend to combine with Mg, Ca, Fe, Ti and Mn, etc. forming $MgSiO_2$, $CaSiO_3$, $FeSiO_3$ etc. and complex compounds such as $Mg.Fe.Ca.Mn.(SiO_3)_2$. Of particular importance is the probable formation of $CaO.Al_2O_3.2SiO_2$ which is stable and similar to Portland cement in its action.

Regardless of the exact mechanism involved, the rapid dispersal of a small amount of one or more of the additive compounds throughout the slurry promotes a massive chemical reaction which creates giant silicate molecules. These giant molecules, as they form, cause the sludge to first gel and set and lose its fluidity. The treated material becomes progressively harder and harder, and finally becomes a structurally sound material strong enough to build earth structures such as dams, dykes and road sub-bases or to be used as high grade fill for excavations.

The chemical reactions can be controlled through the choice of additive compounds and quantity added, so that the treated sludge can be pumped long distances before its fluidity is lost. This characteristic allows dykes and other structures to be formed in a convenient manner.

The following experimental results are given by way of example.

A series of tests were carried out to assess the effect of various additive compounds. 500 ml. samples of tailings sludge from a commercial tar sand treatment plant operating in Northern Alberta, Canada, were placed in a high speed mechanical mixer-blender and the following additive compounds were added to different samples: (1) sulphuric acid, (2) hydrochloric acid, (3) calcium chloride, (4) sulphuric acid and calcium chloride, and (5) calcium oxide. The mixer-blender of course is the equivalent of the pump which would be used in a commercial operation in accordance with the invention. In each case, the additive compound was provided as a 10% solution and 5 mls. of solution was added.

In other words, the weight of additive compound was about 0.1% of the weight of sludge treated. Each sample was mixed at high speed for a few seconds, and an additive compound was added with continued mixing for 5 seconds. The treated sludge was then transferred to a filter funnel set up over a 500 ml measuring cylinder to allow any water to drain off from the gelled sludge. After 48 hours, the sludge was removed for final natural air drying at ambient temperature and the amount of water drained off was measured.

| Sample No. | Observations |
| --- | --- |
| (1) | Immediate gelling to a thick mud consistency- 80 mls of water drained off after 48 hours. Sludge set in 8 hours and became very hard in 6 days. Did not break down when immersed in water for 48 hours. |
| (2) | Same as (1) |
| (3) | Same as (1) but amount of water drained off was 150 mls in 48 hours. |
| (4) | Same as (1) |
| (5) | Excellent results superior to (1). Water release of 50 mls in 48 hours. |

The above results are exemplary. Numerous samples were taken using varying quantities of additive compounds but, in general, the results were similar. From the tests, it was found that preferred additive compounds were sulphuric acid and/or calcium salts, particularly calcium oxide and calcium chloride.

Such tests, when considered in conjunction with the previous description of how the invention is carried out on a commercial scale, demonstrate the technical and economic advantages of the invention.

Other embodiments within the scope of the invention will be apparent to one skilled in the art, the scope of the invention being defined in the appended claims.

What I claim as new and desire to protect by Letters Patent of the United States is:

1. A process for treating tailings sludge from the recovery of bitumen from a source selected from the group consisting of oil sands and oil shales by a hot water separation method, said sludge comprising a slurry of clay minerals and silica in water and having a solids content of at least about 25%, said process consisting essentially of rapidly dispersing throughout the sludge at least one additive compound selected from the group consisting of sulphuric acid, hydrochloric acid, nitric acid, calcium oxide, magnesium oxide, calcium chloride, calcium hydroxide and magnesium hydroxide, said additive being provided in an amount sufficient to cause formation in said sludge of large silicate molecules with resultant solidification of the sludge by gelling and setting into an inert solid material.

2. A process according to claim 1 wherein said additive is rapidly dispersed throughout the sludge by means of a pump through which the sludge is passed from an inlet to an output thereof, with the additive being added to the sludge flowing into the inlet of the pump.

3. A process according to claim 2 wherein the pump is a centrifugal pump operating at a speed of at least about 100 rpm.

4. A process according to claim 1 wherein the amount of additive compound added is in the range of from about 0.01% to about 0.5% by weight of sludge treated.

5. A process according to claim 4 wherein the amount of additive compound added is in the range of from about 0.05% to about 0.25% by weight of sludge treated.

6. A process according to claim 1 wherein the additive compound comprises sulphuric acid.

7. A process according to claim 1 wherein the additive compound comprises calcium chloride.

8. A process according to claim 1 wherein the additive compound comprises at least one member of the group consisting of calcium oxide and calcium hydroxide.

9. A process according to claim 1 wherein the additive compound comprises a mixture of sulphuric acid and calcium chloride.

* * * * *